United States Patent
Matsuoka et al.

[11] Patent Number: 6,056,587
[45] Date of Patent: *May 2, 2000

[54] ELECTRICAL CONNECTION BOX ASSEMBLY

[75] Inventors: Hideo Matsuoka; Toshihisa Sekido, both of Yokkaichi, Japan

[73] Assignee: Sumitomo Wiring Systems, Ltd., Japan

[*] Notice: This patent issued on a continued prosecution application filed under 37 CFR 1.53(d), and is subject to the twenty year patent term provisions of 35 U.S.C. 154(a)(2).

[21] Appl. No.: 09/038,883

[22] Filed: Mar. 11, 1998

[30] Foreign Application Priority Data

Mar. 11, 1997 [JP] Japan .................................. 9-056413

[51] Int. Cl.⁷ .................................................. H01R 13/58
[52] U.S. Cl. ........................................... 439/464; 439/472
[58] Field of Search .................................. 439/464, 465, 439/466, 211, 470, 471, 2, 3; 174/135, 138 F, 71 R, 72 R, 72 A

[56] References Cited

U.S. PATENT DOCUMENTS

| | | | |
|---|---|---|---|
| 3,622,942 | 11/1971 | Rynk | 339/103 |
| 4,564,255 | 1/1986 | Kirma | 339/103 |
| 4,641,899 | 2/1987 | Gallusser et al. | |
| 5,074,805 | 12/1991 | Kirma | |
| 5,315,062 | 5/1994 | Hoshino | 174/52.2 |

FOREIGN PATENT DOCUMENTS 493423  8/1992  Japan .

*Primary Examiner*—Lincoln Donovan
*Attorney, Agent, or Firm*—Jordan B. Bierman; Bierman, Muserlian and Lucas

[57] ABSTRACT

An electrical connection box assembly provided with a projection extending outwardly thereof. The projection is preferably in the shape of a semi-circular channel and a wiring harness passes from electronic devices within the box, through a cut out in the front wall, and rests in the semi-circular channel. It is retained in the channel by a tie strap which is located between two retaining elements spaced apart approximately the width of the strip and forming planes parallel to the front face of the box. In this manner, the tendency of the strap to slide along the projection is eliminated and the strap can be tightened by pulling straight up thereon, thereby minimizing the space needed under the hood to install the device.

7 Claims, 6 Drawing Sheets

ELECTRICAL CONNECTION BOX ASSEMBLY

This Application claims the benefit of the priority of Japanese Application 9-56413, filed Mar. 11, 1997.

The present Invention is directed to electrical connection box assemblies wherein a wire harness is connected to elements within the box and is pulled out therefrom and retained in a harness guide projection. The purpose of the projection is to fix and restrict the harness so that it remains in its proper position.

BACKGROUND OF THE INVENTION

Electrical connection boxes of the type described herein are frequently mounted in automobiles to hold various electronic devices used therein. Typically, such devices include relays and fuses; these connection boxes also house branching points for wire harnesses. As shown in FIGS. 4, 5, and 6, connection box 50 comprises body 52 and cover 51. Front wall 52A has cut out 52B which merges into groove 54 of projection 53. This projection terminates in flange 55.

As particularly shown in FIGS. 5 and 6, wire harness 57 is drawn out of cut out 52B and rests in projection 53. It is secured therein by tie strap 56 which is wrapped around both projection 53 and wire harness 57.

When tie strap 56 is secured so that its longitudinal axis is parallel to front wall 52A (as shown in FIG. 5), gaps 57A and 53A are necessarily formed. Moreover, vibration generated by the automobile has a tendency to cause tie strap 56 to slide along projection 53 so that neither tie strap 56 nor wire harness 57 are properly secured.

If tie strap 56 is placed on projection 53 as shown in FIG. 6, the gaps are eliminated. However, the tendency to move as a result of vibration remains. Moreover, since these devices are installed under the hood of an automobile, the amount of space available is extremely limited. Therefore, if strap 56 is applied as shown in FIG. 6, additional space is required in order to pull it tight. It is more desirable to pull the strap vertically (parallel to front wall 52A of body 52).

SUMMARY OF THE INVENTION

In order to overcome the foregoing defects, the present Invention provides a connection box assembly having a generally rectangular body with a front wall. A cover is placed on the body and a projection extends outwardly thereof from the front wall at an angle thereto other than 90°. Preferably, the projection comprises a channel and the wiring harness is located therein. There is a complementary cut out in the front wall and the wire harness passes through the cut out from the electronic devices within the box and rests within the projection.

A first retaining element extends radially outwardly from the projection and is parallel to the front wall. There is also provided a second retaining element which also extends radially outwardly from the projection. The second retaining element is parallel to the first retaining element and is spaced apart therefrom along the axis of the projection.

The tie strap is located in the space between the two retaining elements with its longitudinal axis parallel to the retaining elements and its edges held therebetween. As a result of this construction, the tie strap can be tightened by pulling on it vertically, thus requiring the minimum amount of space for installation. At the same time, the two retaining elements secure the strap in position so that it cannot slide along the projection.

It is considered particularly advantageous if the retaining elements are flanges and the channel is semi circular in cross section. It is also to be preferred that one of the flanges be adjacent the distal end of the projection.

BRIEF DESCRIPTION OF THE DRAWINGS

In the accompanying drawings, constituting a part hereof and in which like reference characters indicate like parts.

DETAILED DESCRIPTION OF THE INVENTION

Figure 1:
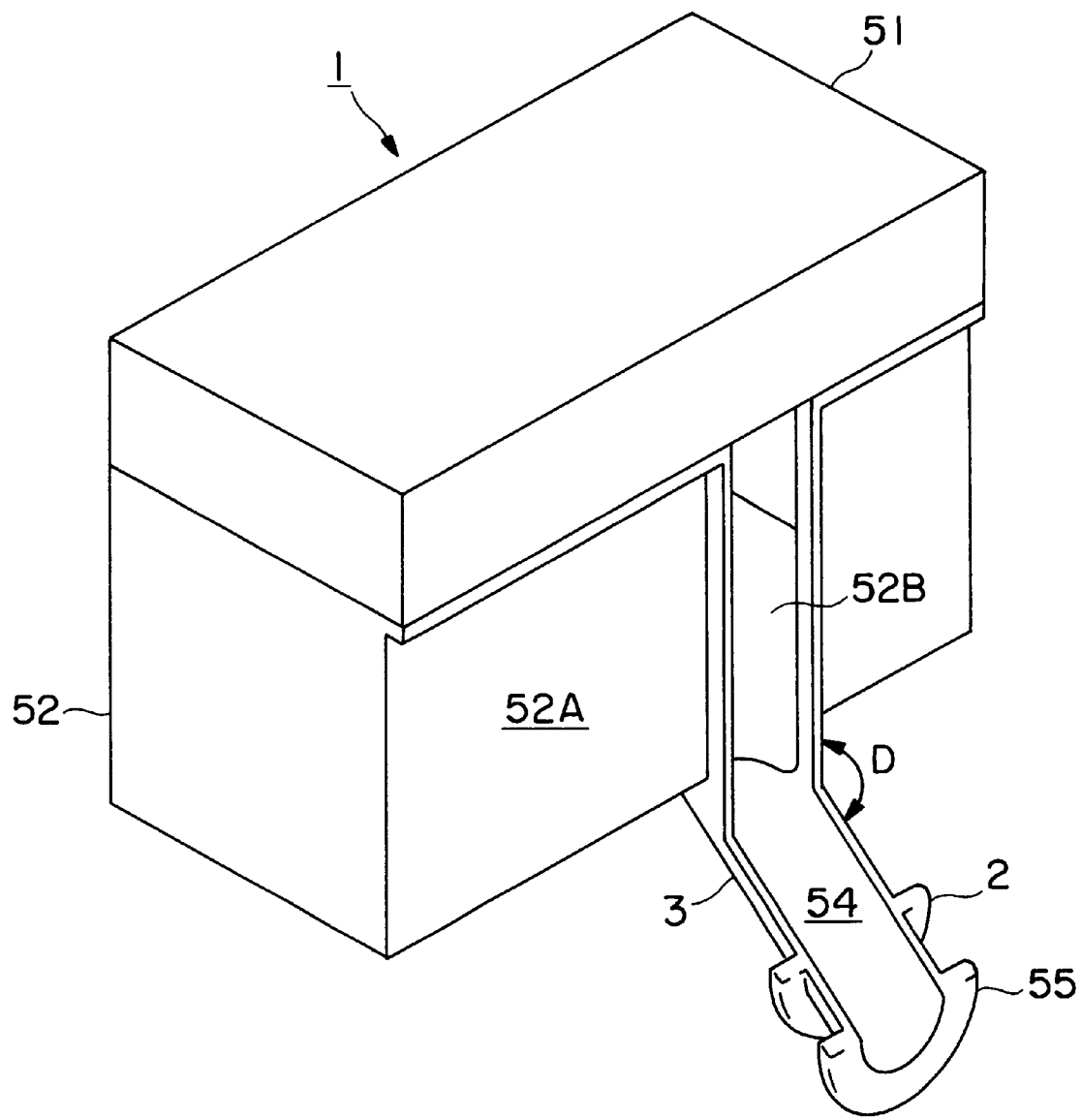
FIG. 1 is a perspective view of a connection box in accordance with the present Invention.
Figure 2:
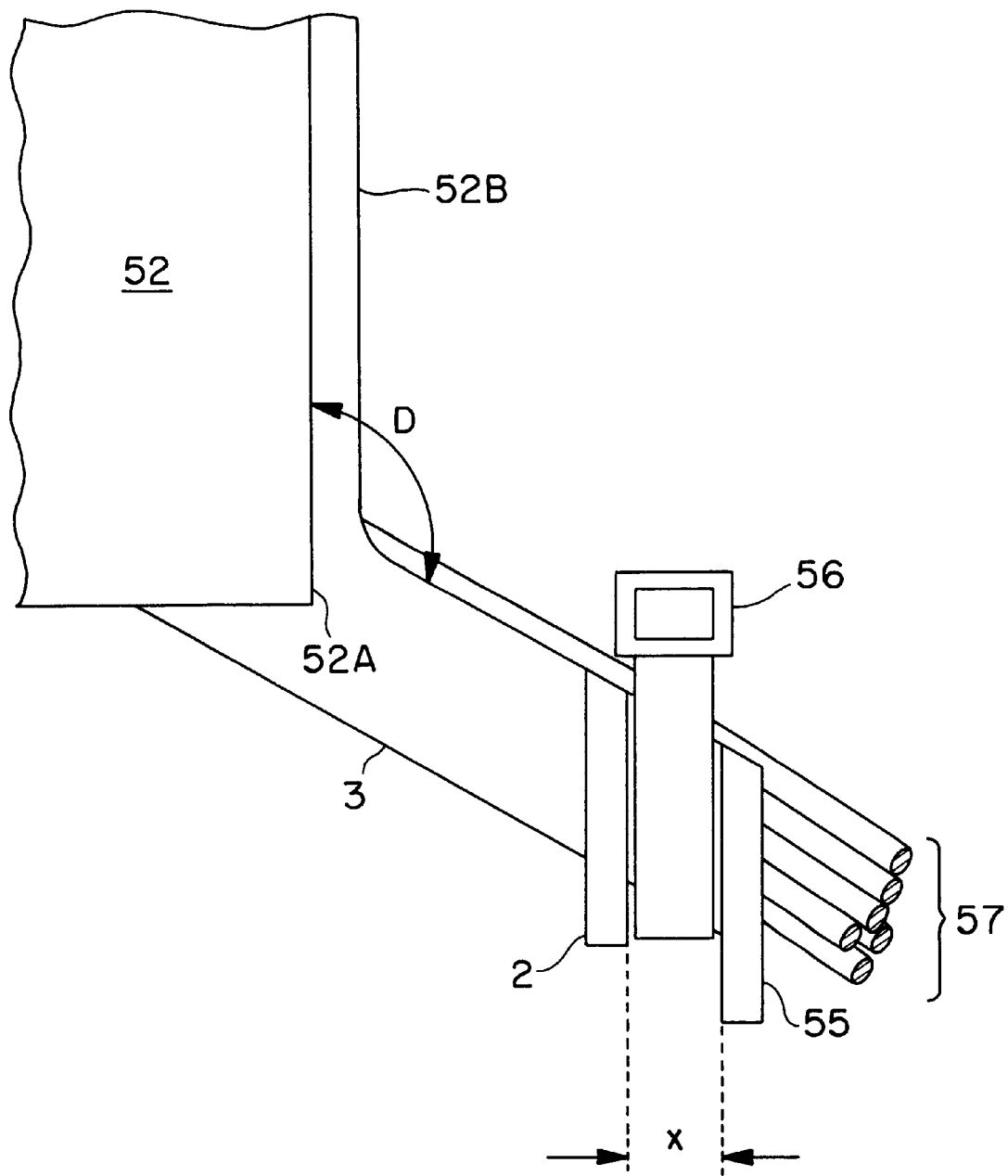
FIG. 2 is a schematic side view of the connection box of FIG. 1.

Connection box 1 comprises body 52 having cover 51. In front wall 52A is cut out 52B. This merges into groove 54 of projection 3. At the distal end of projection 3 is flange 55. Flange 2 is spaced apart from flange 55 on projection 3. Flanges 2 and 55 are parallel to each other and front wall 52A.

Wire harness 57 rests in groove 54 of projection 3 and is secured therein by tie strap 56. This strap is approximately X distance in width so that its edges are adjacent or abut the inner walls of flanges 2 and 55. Projection 3 is at angle D to front wall 52A.

Figure 3:
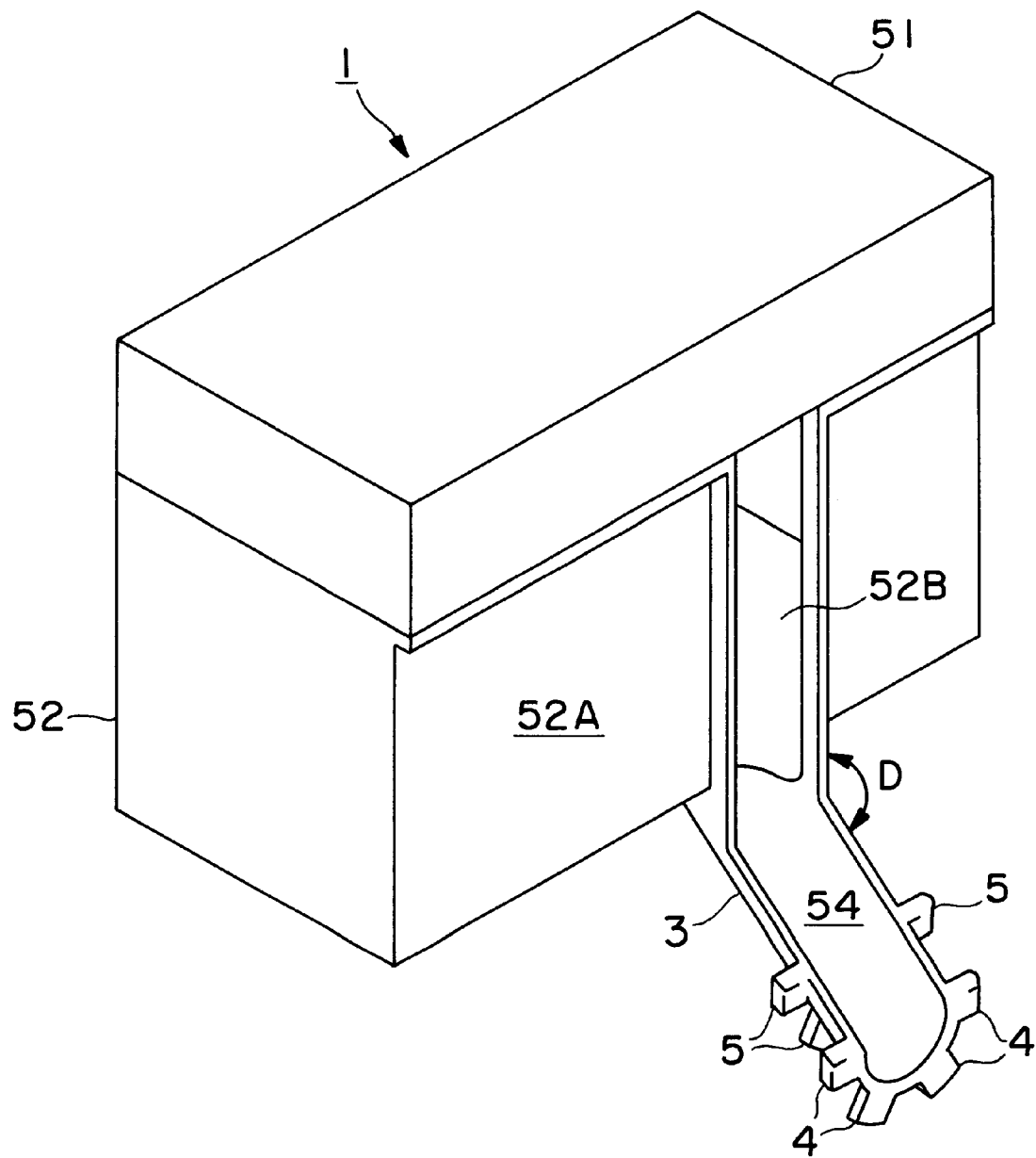
FIG. 3 is a view, similar to that of FIG. 1, of a modification of the present Invention.
Figure 4:
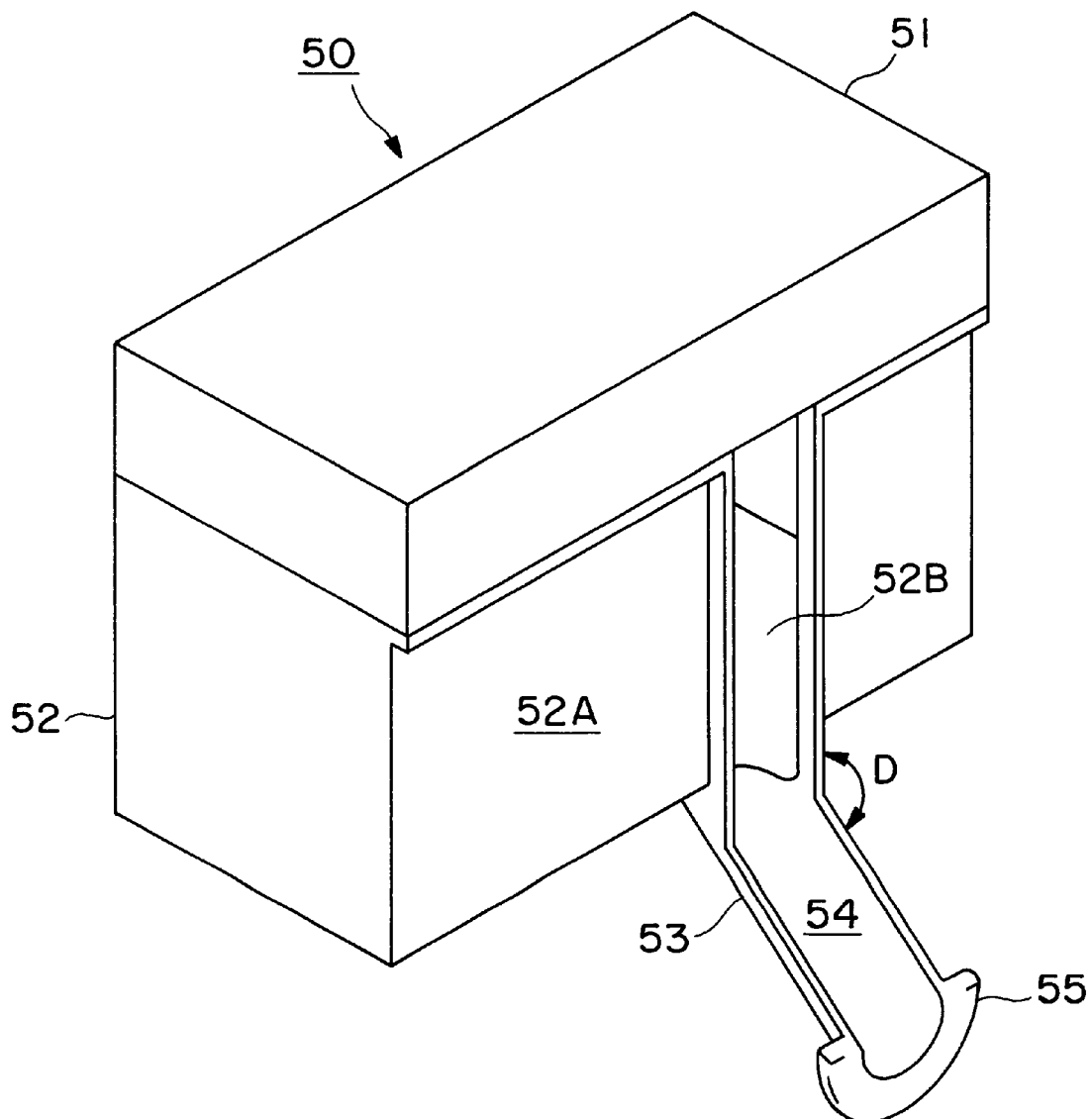
FIG. 4 is a view, similar to that of FIG. 1, of a prior art connection box.
Figure 5:
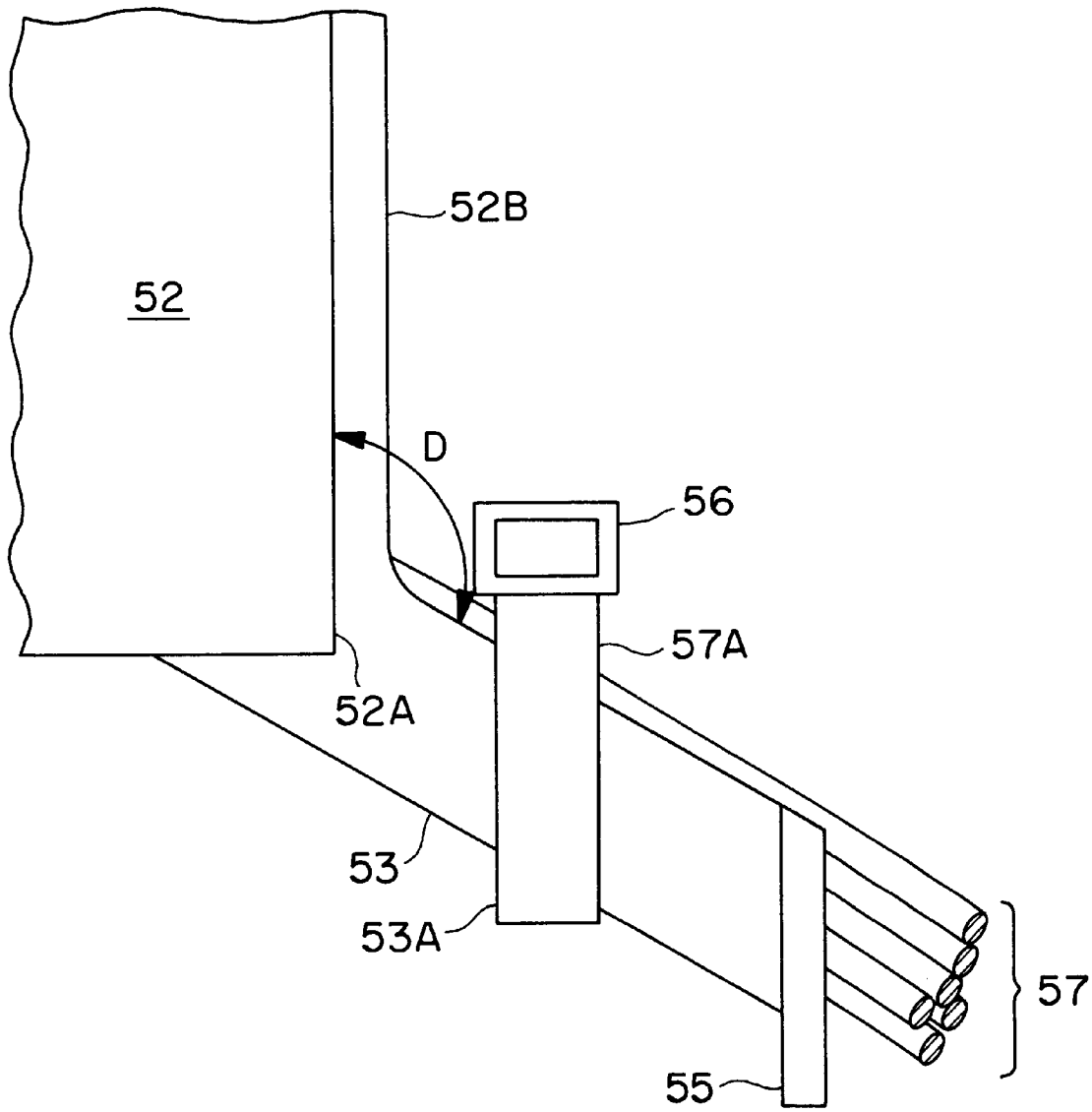
FIG. 5 is a view, similar to that of FIG. 2, of the prior art connection box of FIG. 4.
Figure 6:
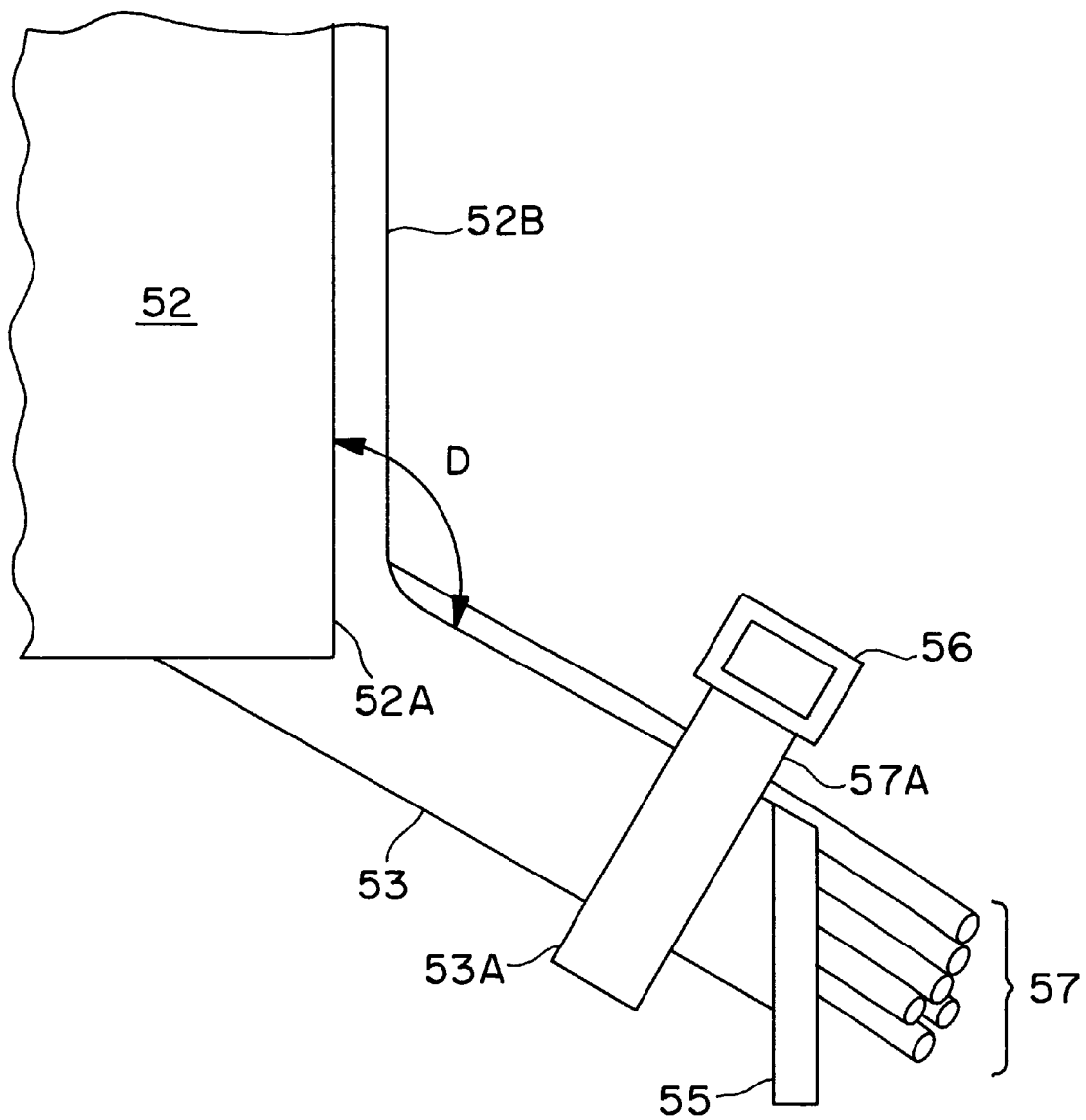
FIG. 6 is a modification of the device of FIG. 5.

In the embodiment of the present Invention shown in FIG. 3, flange 2 is replaced by protuberances 5 and flange 55 is replaced by protuberances 4. This construction has the advantage of using less plastic material. These and other modifications may be made without departing from the scope or spirit of the present Invention.

Although only a limited number of specific embodiments of the present Invention have been expressly described, the Invention is, nonetheless, to be broadly construed and not to be limited except by the character of the claims appended hereto.

What we claim is:

1. An electrical connection box assembly comprising a body having a front wall, a cover on said body, a projection extending outwardly of said body on said front wall, a projection axis of said projection at a projection angle D to said front wall, said angle D being in a range of from more than 0° and less than 180°, said projection comprising a channel, a wire harness in said channel, a cut out in said front wall merging with a proximal end of said projection, a first retaining element extending radially outwardly from said projection, parallel to said front wall throughout said range and a second retaining element extending radially outwardly from said projection and parallel to said first retaining element, said second retaining element being spaced apart from said first retaining element, thereby defining a longitudinal space therebetween, a tie strap in said space securing said wire harness, said tie strap having its longitudinal axis parallel to said first retaining element and said second retaining element, edges of said tie strap being adjacent said first retaining element and said second retaining element, whereby said tie strap is secured to said projection in said space and is parallel to said front wall.

2. The assembly of claim 1 wherein said projection tapes from said front wall to an end of said projection remote from said front wall.

3. The electrical connection box assembly of claim 1 wherein said first retaining element is a first flange and said second retaining element is a second flange.

4. The electrical connection box assembly of claim 1 wherein said channel is semicircular in cross section.

5. The electrical connection box assembly of claim 1 wherein at least one of said first retaining element and said second retaining element comprises a plurality of circumferentially spaced apart protuberances.

6. The electrical connection box assembly of claim 1 wherein said first retaining element is adjacent a distal end of said projection remote from said front wall.

7. The electrical connection box assembly of claim 5 wherein said first retaining element and said second retaining element comprise a plurality of circumferentially spaced apart protuberances.

* * * * *